(12) United States Patent
Morovic et al.

(10) Patent No.: US 10,275,931 B2
(45) Date of Patent: Apr. 30, 2019

(54) GENERATING PREVIEWS OF 3D OBJECTS

(71) Applicant: HEWLETT-PACKARD DEVELOPMENT COMPANY, L.P., Houston, TX (US)

(72) Inventors: Jan Morovic, Colchester (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/539,599

(22) PCT Filed: Jan. 30, 2015

(86) PCT No.: PCT/EP2015/051948
§ 371 (c)(1),
(2) Date: Jun. 23, 2017

(87) PCT Pub. No.: WO2016/119884
PCT Pub. Date: Aug. 4, 2016

(65) Prior Publication Data
US 2018/0018810 A1    Jan. 18, 2018

(51) Int. Cl.
*G06T 15/00* (2011.01)
*G06T 15/08* (2011.01)
(Continued)

(52) U.S. Cl.
CPC ............ *G06T 15/08* (2013.01); *B33Y 50/00* (2014.12); *G06T 15/10* (2013.01); *G06T 15/503* (2013.01);
(Continued)

(58) Field of Classification Search
CPC ............ G06T 15/503; G06T 2210/62; G06T 2200/04; G06T 15/08; G06T 15/10; B33Y 50/00
(Continued)

(56) References Cited

U.S. PATENT DOCUMENTS 7,589,868 B2    9/2009  Velde et al.
8,625,161 B2    1/2014  Ernst et al.
(Continued)

OTHER PUBLICATIONS

Anonymous; "Adobe Photoshop CC Help"; Adobe Photoshop; Sep. 29, 2014, pp. FP=iii, 659-668; http://help.adobe.com/archive/en/photoshop/cc/2014/photoshop_reference.pdf.
(Continued)

*Primary Examiner* — Phu K Nguyen
(74) *Attorney, Agent, or Firm* — HP Inc. Patent Department

(57) ABSTRACT

Methods and apparatus relating to previews of objects are described. In one example, control data for generating a three-dimensional object specifying, for voxels of the object, at least one print material to be deposited in that voxel during object generation is obtained. A viewing frustum may be determined, and visible voxels within the viewing frustum identified. A number of preview display pixels to display the preview may be determined and the set of voxels to be represented by each preview display pixel identified. At least one voxel appearance parameter of a voxel may be determined from the control data. For each preview display pixel, at least one pixel appearance parameter may be determined by combining voxel appearance parameters for the set of voxels to be represented by that preview display pixel. Preview display pixels may be controlled to display a preview of the object according to the at least one pixel appearance parameter.

20 Claims, 2 Drawing Sheets

(51) Int. Cl.
   *G06T 15/50* (2011.01)
   *B33Y 50/00* (2015.01)
   *G06T 15/10* (2011.01)

(52) U.S. Cl.
   CPC ...... *G06T 2200/04* (2013.01); *G06T 2210/62* (2013.01)

(58) Field of Classification Search
   USPC .......................................................... 345/419
   See application file for complete search history.

(56) References Cited

U.S. PATENT DOCUMENTS

| | | | | |
|---|---|---|---|---|
| 8,976,415 | B2* | 3/2015 | Klein Koerkamp | B05D 5/06 358/2.1 |
| 9,073,259 | B2* | 7/2015 | Dufort | G06T 19/00 |
| 9,457,557 | B2* | 10/2016 | Klein Koerkamp | B41C 1/12 |
| 9,527,241 | B2* | 12/2016 | Levine | B33Y 10/00 |
| 9,545,302 | B2* | 1/2017 | Tumey | A61K 35/36 |
| 9,821,546 | B2* | 11/2017 | Schaafsma | B41F 17/001 |
| 9,955,041 | B2* | 4/2018 | Schweid | G06K 15/102 |
| 10,040,275 | B2* | 8/2018 | Lu | B33Y 10/00 |

OTHER PUBLICATIONS

"Autodesk Project Miller Offers 3D Printing Previews"; Oct. 13, 2013; http://www.3ders.org/articles/20131013-free-autodesk-project-miller-offers-3d-printing-previews.html.

Mathieu Hebert; "Yule-Nielsen Effect in Halftone Prints: Graphical Analysis Method and Improvement of the Yule-Nielsen Transform"; Feb. 2014; https://hal.archives-ouvertes.fr/hal-0 0962258/document.

Darnall, A.; "Mattercontrol—Viewing and Modifying Parts"; Sep. 13, 2013; http://www.matterhackers.com/articles/mattercontrol-viewing-and-modifying-parts.

Cho, W., et al; "Methods for Distributed Design and Fabrication of Parts with Local Composition Control"; Oct. 19, 2000; http://www.mit.edu/~tdp/info-flow/publications/nsf00-conf.pdf.

"Photoshop Help / Print 3D Objects"; 2014; http://helpx.adobe.com/photoshop/using/print-3d-objects.html.

Wikipedia; "Ray Tracing (Graphics)"; Dec. 10, 2014; pp. 1-6; https://en.wikipedia.org/w/index.php?title=Ray_tracing_%28graphics%29&oldid=637522305.

* cited by examiner

GENERATING PREVIEWS OF 3D OBJECTS

BACKGROUND

Three-dimensional objects generated by an additive manufacturing process are formed in a layer-by-layer manner. In one example of additive manufacturing, an object is generated by coalescing and solidifying portions of layers of build material. In examples, the build material may be in the form of a powder, fluid or sheet material. The intended coalescence, solidification and/or physical properties may be achieved by printing an agent onto a layer of the build material. Energy may be applied to the layer and the build material which is coated with the agent coalesces and solidifies upon cooling. In other examples, three-dimensional objects may be generated by using extruded plastics or sprayed materials as build materials, which solidify to form an object.

Some printing processes that generate three-dimensional objects use control data generated from a model of a three-dimensional object. This control data may, for example, specify the locations at which to apply an agent to the build material, or where a build material itself may be placed. The agents/build material may be intended to provide a particular appearance to that part of the object, for example a color, gloss or surface texture.

BRIEF DESCRIPTION OF DRAWINGS

For a more complete understanding, reference is now made to the following description taken in conjunction with the accompanying drawings in which.

DETAILED DESCRIPTION

Figure 1:
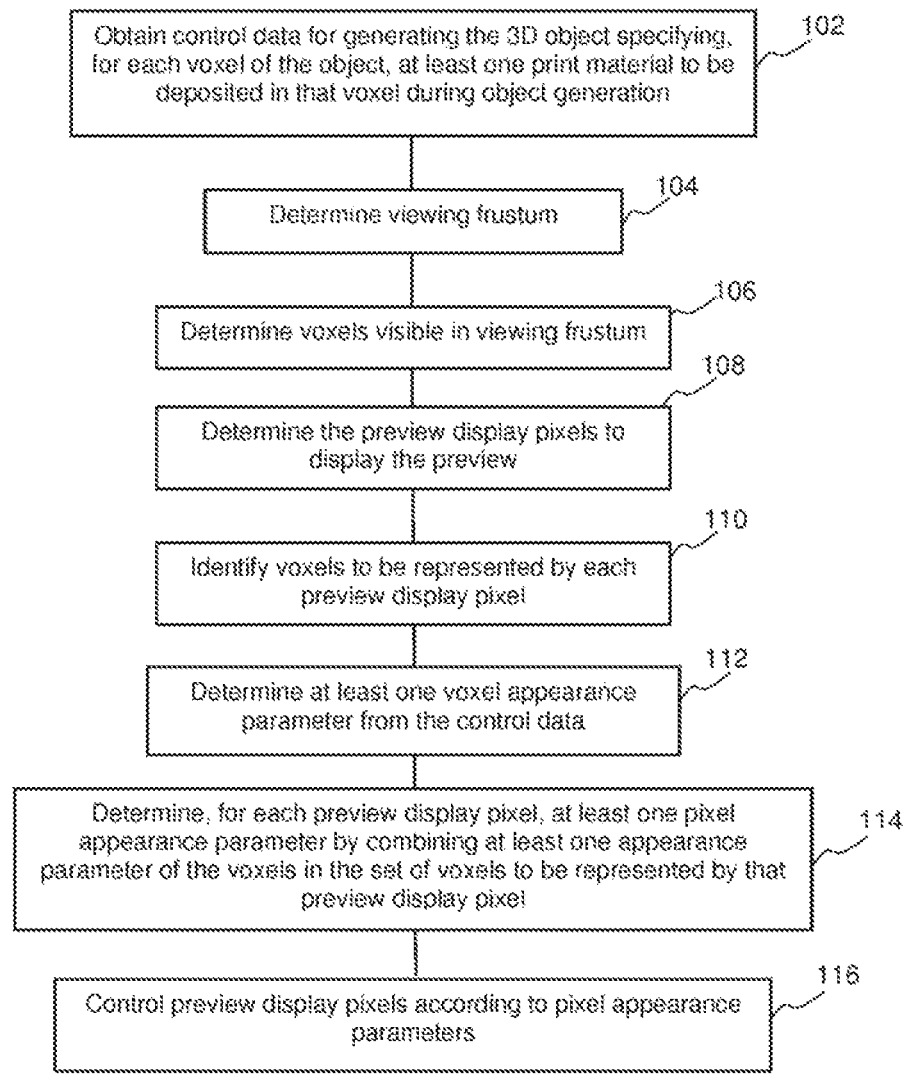
FIG. 1 is a flowchart of an example of a method of generating a preview of a three-dimensional object.

Additive manufacturing apparatus which control data to produce three dimensional objects have been proposed. Such control data may be generated from arbitrary three dimensional content with a variety of specified object properties. These object properties may, for example, comprise appearance properties (color, transparency, glossiness, etc), conductivity, density, porosity and/or mechanical properties such as strength.

In some examples herein, three, dimensional space is characterised in terms of 'voxels', i.e. three-dimensional pixels, wherein each voxel occupies a discrete volume. When producing data modelling a three dimensional object, a voxel at a given location may have at least one characteristic. For example, it may be empty, or may have a particular color, or may represent a particular material, or a particular object property, or the like.

In some examples, data representing a three-dimensional object may be processed to generate control data to be used in generating the object. In some examples, a material volume coverage representation defines print material data, for example detailing the amount of each of the available print materials (such as agent(s) to be printed onto a layer of the build material, or in some examples, build materials themselves), and their combination if needed. This may be specified as a proportional volume coverage (for example, X % of a region of a layer of build material should have agent Y applied thereto). Such print materials may be related to or selected to provided a property such as, for example, color, transparency, flexibility, elasticity, rigidity, surface roughness, porosity, conductivity, inter-layer strength, density, and the like.

The actual location at which print material (for example, a drop of an agent) should be applied, as specified in control data, may be determined using halftoning techniques.

In one example, a set of voxels within object model data may have an associated set of material volume coverage vectors. In a simple case, such a vector may indicate that X % of a given region of three-dimensional space should have one unit of a particular agent applied thereto, whereas (100-X) % should be left clear of agent. The material volume coverage representation then provides the input for a 'halftoning' process to generate control data that may be used by an additive manufacturing system to produce a three-dimensional object. For example, it may be determined that, to produce particular object properties, 25% of a layer of build material (or of a portion of a layer) should have an agent applied thereto. The halftoning process determines where the drops of agent are to be deposited in order to provide 25% coverage, for example by comparing each location to a threshold value provided in a halftone threshold matrix.

In some examples, control data to generate an object that is expected to have certain properties, such as shape, structure, surface texture, color, gloss, etc may be developed. In some examples, a preview may be generated. A first type of preview may comprise 'pre-flighting', which describes the process of ensuring that all the control data is present and in the expected format. This allows errors in the format of control data to be identified. However, it may not identify portions of the data which will produce artefacts such as shapes, colours, textures etc, which are not as intended and would be apparent to an operator in a printed article. In a second type of preview, a rendering of a model which may be the basis of the control data may be generated and displayed to a user.

An example of a method which may be used to generate a preview of a three-dimensional object is shown in FIG. 1.

In block 102, control data for generating the three-dimensional object is obtained. In some examples, this may be provided as an array of voxels and the control data may specify, for non-empty voxels of the object, at least one print material to be deposited in that voxel during object generation. The print material(s) may be agent(s), for example to be applied such that the build material underlying the agent may be caused to coalesce and solidity, or may be selected to impart some particular property, such as a color, glossiness, opacity, surface texture or the like. A color may for example, be defined in a color space, such as a monochrome cantons space, e.g. grayscale; a Red, Green, Blue (RGB) color space; the International Commission on Illumination (CIE) 1931 XYZ color space, wherein three variables ('X', 'V' and 'Z' or tristimulus values) are used to model a color the CIE 1976 (L*, a*, b*—CIELAB or 'LAB') color space, wherein three variables represent lightness ('L') and opposing color dimensions ('a' and 'b'); or any other color space or derived color space. A color value so these color spaces may comprise a continuous tone value, e.g. a value within a predefined range of values. For example, in a simple case, an RGB color value may comprise three 8-bit values; as such each red, green and blue value may be within the range of 0 to 255. These values may be used to form control data, such that the appropriate amount at print material, or combinations of print materials, is deposited at the appropriate location.

In block 104, a viewing frustum (i.e. region of the object which will be represented on a screen for previewing the objects is determined. The voxels which will be visible within the viewing frustum are then determined (block 106). This may comprise a consideration of any, or any combination, of the viewing angle, viewing scale (i.e. the extent of the object to be previewed), the object shape and/or form (for example, which parts of the object will be blocked by other parts) and, in some examples, the level of transparency or opacity of a voxel. In particular examples, a transparency (or equivalency opacity) may be determined for first visible voxel and, from the transparency, it may be determined if a second voxel which is behind the first voxel along the line of sight defined by the viewing frustum is visible. This can be carried out iteratively until it is determined that no further layers of the object will be visible in the viewing frustum.

In block 108, a number of preview display pixels in which the preview is to be displayed determined. In some examples, this may comprise considering the resolution and visible area of a screen (or viewing window within the screen) which will be used to display the preview, and may in some examples be user controllable. At least one voxel appearance parameter of a voxel is determined from the control data (block 110). In some examples, voxel appearance parameters are determined for all the voxels in the viewing frustum. A set of voxels to be represented by each preview display pixel may be identified (block 112). This set of voxels may be a sub-set of the visible voxels. For each preview display pixel, at least one pixel appearance parameter may be determined by combining at least one appearance parameter of the voxels in the set of voxels to be represented by that preview display pixel (block 114), and each preview display pixel is controlled according to pixel appearance parameters(s) determined for that pixel (block 116).

The appearance parameters of the voxels may be determined based on print materials specified in the control data. In some examples, this is the print material specified for printing that voxel. In other examples, the print material specified for printing other voxels, which may in some examples be neighbours, or near neighbours, may also be used to determine the appearance parameter of a voxel.

In an example, the control data may indicate that the print material to be deposited at a particular location is a single ink. In such an example, the appearance of that voxel can be characterised, at least in part, by the color of that ink. In another example, the control data may specify that multiple inks (or multiple other print materials) should be deposited within a voxel, for example with one ink overlapping another. The appearance of that voxel may be characterised by the colors of those inks and the colors of the overlaps. In another example, the glossiness or opacity of a voxel may be specified in the control data and used to determine appearance parameters.

In some examples, voxel appearance parameters may be obtained by measurement of an object generated using the same or equivalent control data for at least one voxel. In such examples, the control data may be used to identify the previously measured appearance parameters which may be held in a memory in association with an indication of the control data used to generate the measured object. In other examples, a model, such as a color model for colors, a bidirectional reflectance distribution functions (BRDFs) for glossiness, or a light transmittance percentage for a given material thickness for opacity, may be used to predict the appearance parameters.

In some examples, the voxel appearance parameters may also take lateral scattering of light into account. More particularly, when light enters a material, it may be modulated in the direction of travel, and may be reflected back along the same path, but may also scatter in the material and exit it from other directions, including, orthogonal (lateral) directions. Therefore, when light is incident on a printed voxel, this, may have an effect on the appearance of its neighbours. This can be taken into account, for example by reference to a lateral scattering model such as the Yule-Nielsen model. Therefore, determining a voxel appearance parameter may comprise considering any effect of other voxels, which in some examples may be neighbour or near neighbour voxels, on a visible voxel. Such voxels may not be within the viewing frustum themselves.

In some examples, voxel appearance parameters may include any or any combination at least one color parameter, glossiness parameter, grain parameter or roughness parameter.

Figure 2:
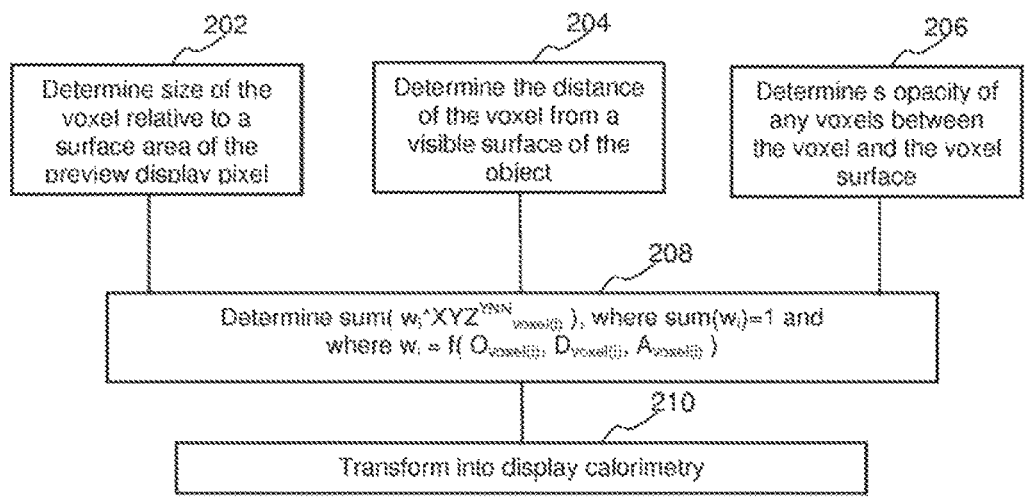
FIG. 2 is a flowchart of an example of a method for combining voxel appearance parameters.

One example of a method for carrying out block 112 is set out in greater detail in FIG. 2. In this example, combining the appearance parameters of the visible voxels comprises determining a convex combination of voxel appearance parameters for the set of voxels. In a particular example, three parameters are determined in order to weight the effect of a voxel in the set: the size of the voxel relative to a surface area of the preview display pixel (noting that, in some examples, voxels may be variable in size) (block 202), the distance of the voxel from a visible surface of the object along the line of sight (block 204); and the opacity of any voxels between the voxel and the object surface (block 206).

The voxels may thereby be assigned a relative weight and their appearance parameters combined in block 208 according to the relationship:

$$XYZ^{YNN}_{display} = \text{sum}(w_i * XYZ^{YNN}_{voxel(i)}).$$

Where:

$XYZ^{YNN}_{display}$ is a Yule-Nielsen corrected domain color space of the display and a voxel respectively, according to the International Commission on Illumination (CIE) 1931 XYZ color space, wherein three variables ('X', 'Y' and 'Z' or tristimulus values) are used to model a color, examples being a Red, Green, Blue (RGB) color space or the CIE 1976 (L*, a*, b*—CIELAB or 'LAB') color space, wherein three variables represent lightness ('L') and opposing color dimensions ('a' and 'b'). In other examples, other color spaces may be used.

$\text{Sum}(w_i)=1$, and is the sum of all voxels in the set corresponding to one display pixel; and $w_i = f(O_{voxel(i)}, D_{voxel(i)}, A_{voxel(i)})$, where O is voxel opacity, D is distance and A is the area of the voxel projected onto the preview display pixel.

f( ) is an empirically determined function and may in some examples be a polynomial. In one example, f( ) is weighted sum of opacity, distance and area, optionally with higher-order terms and cross-terms, for which weights would be computed to minimize error against ground truth measurements. Each display pixel appearance parameter is then determined by transforming a $XYZ^{YNN}_{display}$ to the colorimetry of the display, $XYZ_{display}$ (block 210). The International Commission on Illumination (CIE) 1931 XYZ color space, wherein three variables ('X', 'Y' and 'Z' or tristimulus values), may be used to model a color. For example, it can be interpreted in an sRGB domain for display.

As it is based on the control data rather than, for example, the model data used to generate the control data, a more accurate preview can be generated that may, in addition to demonstrating a poor quality model, also allow poor quality control data generation (or control data having unintended artefacts and the like) to be detected. Such detection can occur early in the production pipeline and may prevent articles having unintended features or characteristics from being manufactured at all.

Figure 3:
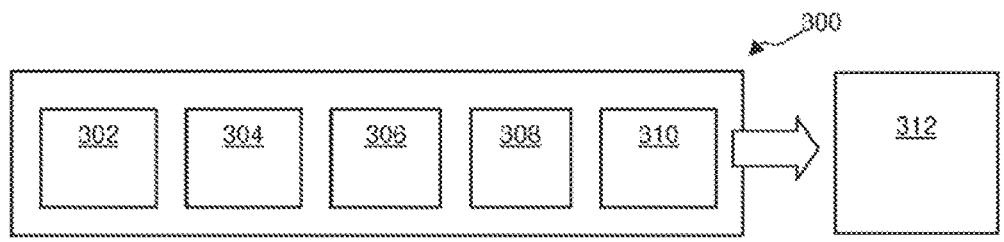
FIG. 3 is a simplified schematic of an example of processing apparatus.

FIG. 3 shows an example of processing apparatus 300 for generating a preview of a three dimensional object to be generated by an additive manufacturing apparatus. The apparatus 300 comprises an interface 302 to receive control data for generating a three-dimensional object and specifying, for each vessel of the object, at least one print material to be deposited in that voxel during object generation. The apparatus 300 further comprises an image processing module 304 to determine which of the voxels is visible in a viewing frustum and to determine voxel appearance parameters from the control data, a mapping module 306 to map each visible voxel to a voxel set, wherein each voxel set is to be represented in a (different) preview display pixel, a combining module 308 to combine at least one appearance parameter of the voxels in a voxel set and to generate at least one pixel appearance parameter and a display control data module 310 to determine display control data to control a pixel of a display according to the pixel appearance parameter. In this example, the apparatus 300 is associated with a display 312 to display the preview according to the display control data, although in other examples, the display control data may stored, or may be transmitted, for example to a remote display.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution. Use order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

Figure 4:
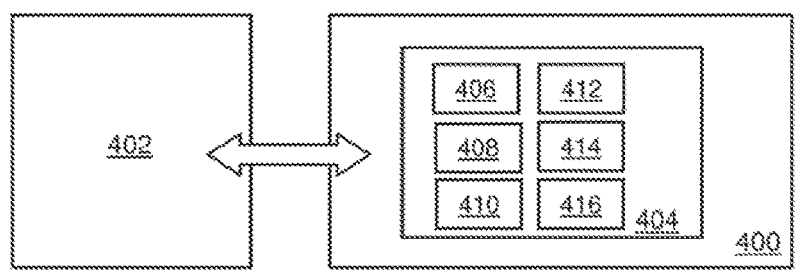
FIG. 4 is a simplified schematic of ah example of a processor and a memory.

FIG. 4 shows an example of a processor 400 associated with a memory 402. The memory comprises computer readable instructions 404 which are executable by the processor 400. The instructions 404 comprise (i) instructions 406 to identity control data for an additive manufacturing apparatus, the control data being to generate a three-dimensional object and specifying, for voxels of the object, at least one print material to be deposited at that voxel during object generation (which may, for example, comprise instructions to determine, from the control data, at least one voxel appearance parameter determine at least one of color, glossiness, grain, roughness and opacity of a voxel).

(ii) instructions 408 to determine, from the control data, at least one voxel appearance parameter of a voxel in the three-dimensional object;

(iii) instructions 410 to determine, for a viewing frustum, the visible voxels of the three dimensional object;

(iv) instructions 412 to determine, for a display pixel, a set of visible voxels to be represented thereby (which may, in some examples comprise determining the number of layers of visible voxels in the direction of the viewing frustum, and which may be carried out for a plurality of display pixels);

(v) instructions 414 to combine at least one voxel appearance parameter of the voxels in a set of visible voxels; and (vi) instructions 418 to determine control data to control a pixel to display a representation of combined appearance parameters.

The machine readable instructions may, for example, be executed by a general purpose computer, a special purpose computer, an embedded processor or processors of other programmable data processing devices to realize the functions described in the description and diagrams. In particular, a processor or processing apparatus may execute machine readable instructions to operate as the apparatus 300, or any component or module thereof. Thus functional modules of the apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects nave been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a future or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

Features described in relation to one example may be combined with, or replaced by those of another example.

The features of any dependent claim may be combined with the features of any of the independent claims or other dependent claims.

The invention claimed is:

1. A method comprising:
    obtaining control data for generating a three-dimensional object, the control data specifying, for a plurality of voxels of the object, at least one print material to be deposited in that voxel during object generation;
    determining a viewing frustum;
    determining voxels visible within the viewing frustum;
    determining a number of preview display pixels to display a preview of the object;
    identifying a set of voxels to be represented by each preview display pixel;
    determining at least one appearance parameter of a voxel from the control data;
    determining, for each preview display pixel, at least one pixel appearance parameter by combining appearance parameters for the set of voxels to be represented by that preview display pixel; and
    controlling the preview display pixels to display a preview of the object according to the at least one pixel appearance parameter.

2. The method according to claim 1 in which determining the visible voxels comprises determining a transparency of a first visible voxel and further determining, from the transparency, if a second voxel which is behind the first visible voxel is visible.

3. The method according to claim 1 in which combining the appearance parameters of the voxels comprises determining a convex combination of appearance parameters of the set of voxels, wherein the weight of the parameters of each voxel depends on at least one of:
    a. the size of the voxel relative to a surface area of the preview display pixel;
    b. the distance of the voxel from a visible surface of the object;
    c. the opacity of any voxels between the voxel and the voxel surface.

4. The method according to claim 3 in which combining the appearance parameters of the voxels comprises determining a colorimetry by evaluating:
    $sum(w_i * XYZ^{YNN}_{voxel(i)})$, where $sum(w_i)=1$ and where $w_i = f(O_{voxel(i)}, D_{voxel(i)}, A_{voxel(i)})$, where O is opacity, D is depth and A is area of the voxel projected onto the preview display pixel, and where f( ) is an empirically determined function.

5. The method according to claim 4 in which determining a pixel appearance parameter comprises transforming the determined colorimetry into a display domain colorimetry.

6. The method according to claim 1 in which the at least one appearance parameter of a voxel comprises at least one of a color parameter, a glossiness parameter, a grain parameter; a roughness parameter.

7. The method according to claim 1 in which determining the at least one appearance parameter of a voxel comprises a determination of lateral scattering from other voxels.

8. The method according to claim 1 in which determining the number of preview pixels comprises determining the resolution of a display apparatus to display the preview.

9. The method of claim 1, in which the at least one appearance parameter of a voxel is based on a print material specified in the control data for printing the voxel.

10. The method of claim 1, in which the at least one appearance parameter of a voxel is further based on a print material specified in the control data for printing another voxel.

11. The method of claim 1, in which the set of voxels have an associated set of material volume coverage vectors.

12. The method of claim 1, in which the print material is ink.

13. The method of claim 1, in which determining voxels visible within the viewing frustum is based on which parts of the object are blocked by other parts.

14. Processing apparatus comprising:
    an interface to receive control data for generating a three-dimensional object and specifying, for voxels of the object, at least one print material to be deposited at that voxel during object generation;
    an image processing module to determine which of the voxels is visible in a viewing frustum and to determine, from the control data, at least one voxel appearance parameter for a voxel;
    a mapping module to map each visible voxel to a voxel set, wherein each voxel set is to be represented in a preview display pixel;
    a combining module to combine at least one voxel appearance parameter of the voxels in each voxel set and to generate at least one pixel appearance parameter; and
    a display control data module to determine display control data to control a pixel of a display according to the pixel appearance parameter.

15. The apparatus according to claim 14 which further comprises a display to display a preview image of the object according to the display control data.

16. The apparatus according to claim 15 in which the mapping module is to determine the voxels to be mapped to a voxel set by determining the resolution of the display.

17. The apparatus according to claim 14 in which the interface is to receive an indication of a viewing angle and the image processing module is to use the viewing angle to determine the viewing frustum.

18. A non-transitory computer readable storage medium encoded with instructions, executable by a processor, the machine readable storage medium comprising:
    instructions to identify control data for an additive manufacturing apparatus, the control data being to generate a three-dimensional object and specifying, for voxels of the object, at least one print material to be deposited at that voxel during object generation;
    instructions to determine, from the control data, at least one voxel appearance parameter of a voxel in the three-dimensional object;
    instructions to determine, for a viewing frustum, the visible voxels of the three dimensional object;
    instructions to determine, for a display pixel, a set of visible voxels to be represented by that display pixel;
    instructions to combine at least one voxel appearance parameter of the voxels in a set of visible voxels; and
    instructions to determine control data to control a pixel of a display to display a representation of the combined appearance parameters.

19. The non-transitory computer readable storage medium according to claim 18 in which the instructions to determine, from the control data, at least one voxel appearance parameter comprise instructions to determine data characterising at least one of color, glossiness, grain, roughness and opacity of a voxel.

20. The non-transitory computer readable storage medium according to claim 18 in which the instructions to determine the visible voxels comprise instructions to determine the number of layers of visible voxels in the direction of the viewing frustum.

* * * * *

UNITED STATES PATENT AND TRADEMARK OFFICE
CERTIFICATE OF CORRECTION

PATENT NO. : 10,275,931 B2
APPLICATION NO. : 15/539599
DATED : April 30, 2019
INVENTOR(S) : Jan Morovic et al.

It is certified that error appears in the above-identified patent and that said Letters Patent is hereby corrected as shown below:

In the Drawings

In sheet 2 of 2, FIG. 2, reference numeral 206, delete "Determine s opacity of" and insert
-- Determine the opacity of --, therefor.

Signed and Sealed this
Sixth Day of August, 2019

Andrei Iancu
*Director of the United States Patent and Trademark Office*